United States Patent
Yoon et al.

(10) Patent No.: US 12,503,494 B2
(45) Date of Patent: Dec. 23, 2025

(54) **ANTIBACTERIAL PROTEIN CDL200 HAVING LYTIC ACTIVITY AGAINST *CLOSTRIDIOIDES DIFFICILE***

(71) Applicant: Intron Biotechnology, Inc., Gyeonggi-do (KR)

(72) Inventors: Seong Jun Yoon, Seoul (KR); Jee Soo Son, Seoul (KR); In Hwang Kim, Gyeonggi-do (KR); Cheol Ahn, Gyeonggi-do (KR); Soo Youn Jun, Seoul (KR); Sang Hyeon Kang, Seoul (KR)

(73) Assignee: INTRON BIOTECHNOLOGY, INC., Gyeonggi-Do (KR)

( * ) Notice: Subject to any disclaimer, the term of this patent is extended or adjusted under 35 U.S.C. 154(b) by 602 days.

(21) Appl. No.: 17/920,149

(22) PCT Filed: Mar. 31, 2021

(86) PCT No.: PCT/KR2021/003965
§ 371 (c)(1),
(2) Date: Oct. 20, 2022

(87) PCT Pub. No.: WO2021/215687
PCT Pub. Date: Oct. 28, 2021

(65) Prior Publication Data
US 2023/0159599 A1    May 25, 2023

(30) Foreign Application Priority Data
Apr. 22, 2020   (KR) .................. 10-2020-0048974

(51) Int. Cl.
| | | |
|---|---|---|
| *C07K 14/47* | (2006.01) | |
| *A01N 63/50* | (2020.01) | |
| *A23L 33/17* | (2016.01) | |
| *A61K 38/00* | (2006.01) | |
| *A61P 31/04* | (2006.01) | |

(52) U.S. Cl.
CPC .............. *C07K 14/47* (2013.01); *A01N 63/50* (2020.01); *A23L 33/17* (2016.08); *A61P 31/04* (2018.01); *A61K 38/00* (2013.01)

(58) Field of Classification Search
None
See application file for complete search history.

(56) References Cited

FOREIGN PATENT DOCUMENTS

| WO | WO 2019/197836 A1 | 10/2019 |
|---|---|---|
| WO | WO 2020/057742 A1 | 3/2020 |

OTHER PUBLICATIONS

NCBI. NCBI Reference Sequence No. WP_131038093.1. N-acetylmuramoyl-L-alanine amidase, partial [Clostridioides difficile] May 13, 2019.
Hing, T.C. et al. The antimicrobial peptide cathelicidin modulates Clostridium difficile-associated colitis and toxin A-mediated enteritis in mice. Gut, 2013, vol. 62, No. 9, pp. 1295-1305.
International Search Report and Written Opinion were mailed on Jul. 21, 2021 by the International Searching Authority for International Application No. PCT/KR2021/003965 filed on Mar. 31, 2021 and published as WO 2021/215687 (Applicant—Intron Biotechnology Inc) (8 pages).

*Primary Examiner* — Sergio Coffa
(74) *Attorney, Agent, or Firm* — BALLARD SPAHR LLP

(57) ABSTRACT

The present invention relates to an antibacterial protein CDL200 with an antibacterial activity specific against Clostridioides *difficile*. More specifically, the present invention relates to an antibacterial protein CDL200 specific to Clostridioides *difficile* that may infect and cause disease in animals including humans, the antibacterial protein CDL200 being characterized by having the ability to specifically lyse the Clostridioides *difficile* and containing the amino acid sequence represented by SEQ ID NO: 1. In addition, the present invention relates to a pharmaceutical composition for treating an infection or disease caused by Clostridioides *difficile*, the composition containing the antibacterial protein CDL200 specific to Clostridioides *difficile* as an active ingredient.

7 Claims, 2 Drawing Sheets
Specification includes a Sequence Listing.

[FIG. 1]
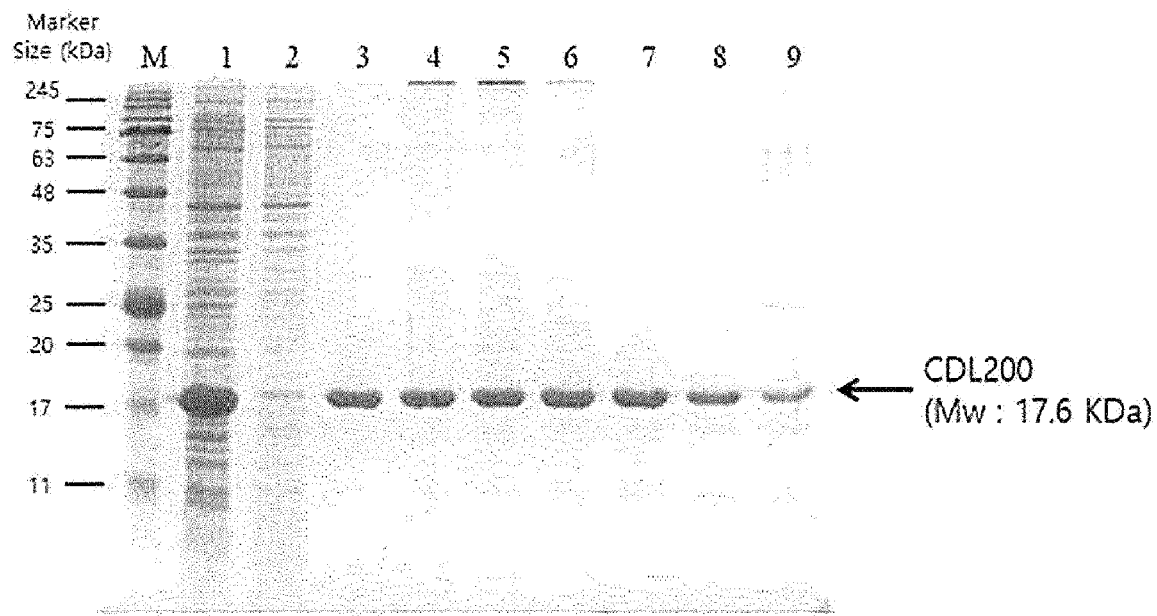
[FIG. 2]
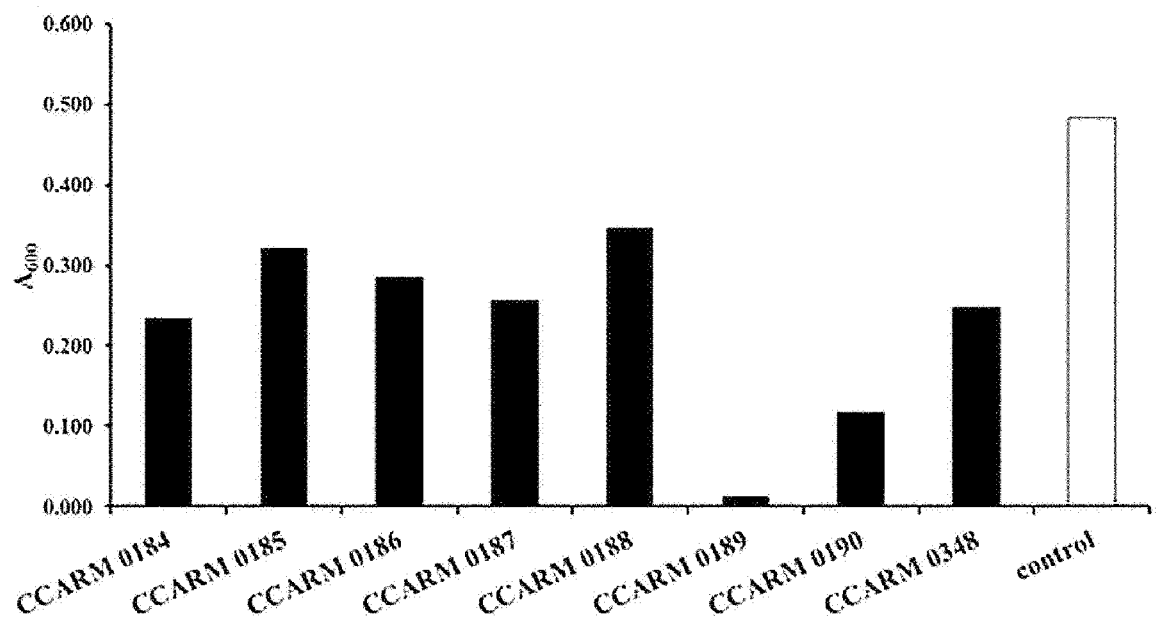

[FIG. 3]
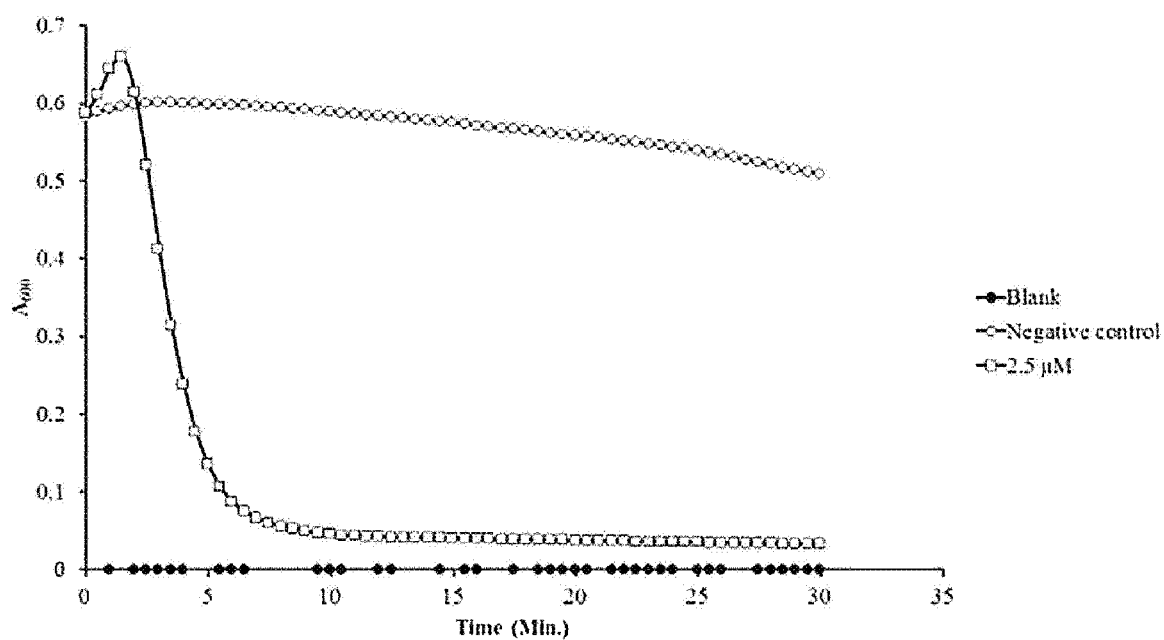

SEQUENCE LISTING

<160> NUMBER OF SEQ ID NOS: 2

<210> SEQ ID NO 1
<211> LENGTH: 160
<212> TYPE: PRT
<213> ORGANISM: Artificial Sequence
<220> FEATURE:
<223> OTHER INFORMATION: Antibacterial protein CDL200

<400> SEQUENCE: 1

Met Val Asp Ile Ile Lys Met Leu Thr Lys Lys Ser Tyr Pro Asn
1               5                   10                  15

Lys Asn Ser Pro Lys Phe Ile Val Ile His Glu Thr Asp Asn Glu Asp
                20                  25                  30

Lys Gly Ala Asp Ala Lys Arg His Ala Gln Ala Leu Asn Asn Gly Asn
            35                  40                  45

Leu Glu Ala Ser Val His Tyr Tyr Val Asp Asp Lys Val Ile Tyr Gln
50                  55                  60

Thr Leu Asp His Lys Asp Gly Ala Trp Ala Val Gly Lys Ser Tyr Gly
65                  70                  75                  80

Thr Ala Leu Val Ala Gly Val Thr Asn Tyr Asn Ser Ile Asn Ile Glu
                85                  90                  95

Ile Cys Val Asn Arg Asp Gly Asn Tyr Thr Lys Ala Arg Gln Asn Ala
            100                 105                 110

Ile Asp Leu Thr Arg Lys Leu Met Lys Asp Leu Asn Ile Ser Thr Asp
        115                 120                 125

Lys Val Ile Arg His Tyr Asp Ala Lys Arg Lys Tyr Cys Pro Arg Lys
    130                 135                 140

Met Leu Asp Asn Pro Lys Leu Trp Val Asp Phe Lys Asp Lys Ile Lys
145                 150                 155                 160

<210> SEQ ID NO 2
<211> LENGTH: 3711
<212> TYPE: DNA
<213> ORGANISM: Artificial Sequence
<220> FEATURE:
<223> OTHER INFORMATION: Gene coding Escherichia coli Top10-CDL200 to
      produce antibacterial protein CDL200

<400> SEQUENCE: 2
ccatcgaatg gccagatgat taattcctaa ttttttgttga cactctatca ttgatagagt      60
tattttacca ctccctatca gtgatagaga aaagtgaaat gaatagttcg acaaaaatct     120
agaaataatt tgtttaact  ttaagaagga gatatacata tggttgatat catcaagatg     180
ttaacgaaaa aaaagtctta cccaaataaa aattcgccga agttcatcgt aattcacgaa     240
accgataacg aagataaagg tgcggatgca aagcgccacg cgcaggcctt gaataatggg     300
aacttagaag cgtcagtcca ttactacgta gatgataagg ttatctacca gacgttggac     360
cataaagatg gtgcatgggc tgtgggcaaa agttacggaa ccgcgcttgt ggccggtgtc     420
acgaattaca actccatcaa catagagatt tgtgtaaatc gggacggaaa ttatacaaag     480
gcgagacaga acgcaatcga ccttactcgt aagttgatga agacttgaa  catatctact     540 gataaagtca ttcgccacta tgatgcgaaa cgcaaatact gccccgtaa  gatgttagat     600 aaccccaaat tgtgggtgga tttcaaggac aagatcaagt agaattcgag ctcggtaccc     660
ggggatccct cgaggtcgac ctgcaggggg accatggtct cagcgcttgg agccaccgc      720 agttcgaaaa ataataagct tgacctgtga agtgaaaaat ggcgcacatt gtgcgacatt     780

```
tttttttgtct gccgtttacc gctactgcgt cacggatctc cacgcgccct gtagcggcgc    840
attaagcgcg gcgggtgtgg tggttacgcg cagcgtgacc gctacacttg ccagcgccct    900
agcgcccgct cctttcgctt tcttcccttc ctttctcgcc acgttcgccg gctttccccg    960
tcaagctcta aatcggggc tcccttagg gttccgattt agtgcttac ggcacctcga    1020 cccccaaaaaa cttgattagg gtgatggttc acgtagtggg ccatcgccct gatagacggt    1080
ttttcgccct tgacgttgg agtccacgtt ctttaatagt ggactcttgt tccaaactgg    1140
aacaacactc aaccctatct cggtctattc ttttgattta taagggattt tgccgatttc    1200
ggcctattgg ttaaaaaatg agctgattta acaaaaattt aacgcgaatt ttaacaaaat    1260
attaacgctt acaatttcag gtggcacttt tcggggaaat gtgcgcggaa ccctatttg    1320 tttatttttc taaatacatt caaatatgta tccgctcatg agacaataac cctgataaat    1380
gcttcaataa tattgaaaaa ggaagagtat gagtattcaa catttccgtg tcgcccttat    1440
tccctttttt gcggcatttt gccttcctgt ttttgctcac ccagaaacgc tggtgaaagt    1500
aaaagatgct gaagatcagt tgggtgcacg agtgggttac atcgaactgg atctcaacag    1560
cggtaagatc cttgagagtt ttcgccccga agaacgtttt ccaatgatga gcacttttaa    1620
agttctgcta tgtggcgcgg tattatcccg tattgacgcc gggcaagagc aactcggtcg    1680
ccgcatacac tattctcaga atgacttggt tgagtactca ccagtcacag aaaagcatct    1740 tacgatggc atgacagtaa gagaattatg cagtgctgcc ataaccatga gtgataacac    1800
tgcggccaac ttacttctga acgatcgg aggaccgaag gagctaaccg cttttttgca    1860
caacatgggg gatcatgtaa ctcgccttga tcgttgggaa ccggagctga atgaagccat    1920
accaaacgac gagcgtgaca ccacgatgcc tgtagcaatg gcaacaacgt tgcgcaaact    1980
attaactggc gaactactta ctctagcttc ccggcaacaa ttgatagact ggatggaggc    2040
ggataaagtt gcaggaccac ttctgcgctc ggcccttccg gctggctggt ttattgctga    2100
taaatctgga gccggtgagc gtgggtctcg cggtatcatt gcagcactgg ggccagatgg    2160
taagccctcc cgtatcgtag ttatctacac gacggggagt caggcaacta tggatgaacg    2220
aaatagacag atcgctgaga taggtgcctc actgattaag cattggtagg aattaatgat    2280
gtctcgttta gataaaagta agtgattaa cagcgcatta gagctgctta atgaggtcgg    2340
aatcgaaggt ttaacaaccc gtaaactcgc ccagaagcta ggtgtagagc agcctacatt    2400
gtattggcat gtaaaaaata gcgggctttg ctcgacgcc ttagccattg agatgttaga    2460
taggcaccat actcactttt gcccttttaga aggggaaagc tggcaagatt ttttacgtaa    2520
taacgctaaa agttttagat gtgctttact aagtcatcgc gatggagcaa aagtacatt    2580 aggtacacgg cctacagaaa acagtatga aactctcgaa aatcaattag ccttttttatg    2640 ccaacaaggt ttttcactag agaatgcatt atatgcactc agcgcagtgg ggcattttac    2700
tttaggttgc gtattggaag tcaagagca tcaagtcgct aaagaagaaa gggaaacacc    2760
tactactgat agtatgccgc cattattacg acaagctatc gaattatttg atcaccaagg    2820
tgcagagcca gccttcttat tcggccttga attgatcatt tgcggattag aaaaacaact    2880
taaatgtgaa agtgggtctt aaaagcagca taacctttt ccgtgatggt aacttcacta    2940
gtttaaaagg atctaggtga agatccttt tgataatctc atgaccaaaa tcccttaacg    3000
tgagttttcg ttccactgag cgtcagaccc cgtagaaaag atcaaggat cttcttgaga    3060 tcctttttttt ctgcgcgtaa tctgctgctt gcaaacaaaa aaaccaccgc taccagcggt    3120
ggttttgttg ccggatcaag agctaccaac tctttttccg aaggtaactg gcttcagcag    3180
```

-continued

```
agcgcagata ccaaatactg tccttctagt gtagccgtag ttaggccacc acttcaagaa    3240
ctctgtagca ccgcctacat acctcgctct gctaatcctg ttaccagtgg ctgctgccag    3300
tggcgataag tcgtgtctta ccggghttgga ctcaagacga tagttaccgg ataaggcgca    3360
gcggtcgggc tgaacggggg gttcgtgcac acagcccagc ttggagcgaa cgacctacac    3420
cgaactgaga tacctacagc gtgagctatg agaaagcgcc acgcttcccg aagggagaaa    3480
ggcggacagg tatccggtaa gcggcagggt cggaacagga gagcgcacga gggagcttcc    3540 aggggggaaac gcctggtatc tttatagtcc tgtcgggttt cgccacctct gacttgagcg    3600
tcgatttttg tgatgctcgt caggggggcg gagcctatgg aaaaacgcca gcaacgcggc    3660 cttttttacgg ttcctggcct tttgctggcc ttttgctcac atgacccgac a            3711
```

ANTIBACTERIAL PROTEIN CDL200 HAVING LYTIC ACTIVITY AGAINST *CLOSTRIDIOIDES DIFFICILE*

CROSS-REFERENCE TO RELATED APPLICATIONS

This application is a U.S. National Phase Application of International Application No. PCT/KR2021/003965, filed Mar. 31, 2021, which claims priority to Korean Application No. 10-2020-0048974, filed Apr. 22, 2020, each of which are hereby incorporated by reference in their entirety.

REFERENCE TO SEQUENCE LISTING

The Sequence Listing submitted Oct. 20, 2022 as a text file named "08162_0079U1_Sequence_Listing. txt," created on Sep. 26, 2022, and having a size of 6,851 bytes is hereby incorporated by reference pursuant to 37 C.F.R. § 1.52(e)(5).

TECHNICAL FIELD

The present invention relates to an antibacterial protein CDL200 having bacteriolytic activity against Clostridioides *difficile*. More particularly, the present invention relates to a Clostridioides *difficile*-specific antibacterial protein CDL200 having the ability to specifically lyse Clostridioides *difficile* that may cause diseases by infecting animals including humans and having an amino acid sequence represented by SEQ ID NO: 1 and to a pharmaceutical composition containing the Clostridioides *difficile*-specific antibacterial protein CDL200 as an active ingredient for preventing or treating a Clostridioides *difficile* infection and diseases caused by Clostridioides *difficile*.

BACKGROUND ART

Clostridioides *difficile* is a Gram-positive, spore-forming, anaerobic bacterium resident in in the intestinal tract of humans and animals and is known to cause disease by opportunistic infections. As with Methicillin-resistant *Staphylococcus aureus* (MRSA) and Vancomycin-Resistant Enterococci (VRE), Clostridioides *difficile* is one of the major causative species of pathogenic pathogens. When the balance of the normal intestinal microflora is disrupted due to antibiotic treatment, antibiotic resistant Clostridioides *difficile* dominates the intestine and secretes enterotoxin (toxin A) and cytotoxin (toxin B), thereby causing intestinal inflammation and necrosis. In addition, Clostridioides *difficile* causes diarrhea and pseudomembranous colitis, and if not properly treated, the disease aggravates into sepsis or toxic megacolon and, in severe cases, into death.

In 2008, 700 cases of Clostridioides *difficile* infection were reported in Korea, but in 2011, the number of cases reported increased to 2,521, which was an increase of about 3.6 times, and the mortality rate increased by about 2.5 times. In addition, the economic cost of Clostridioides *difficile* infections was about 270 million won in 2008 and increased to about 1.85 billion won corresponding to an increase of 6.45 times in 2011. It is now estimated that the figure has increased further. In recent years, not only nosocomial infections, but also community infections, such as recurring diseases after an infected person in a hospital comes out to the community after treatment, or spreading pathogens to others from an infected person, causing infection, have become a problem. In Korea, it is estimated that about 10% of Clostridioides *difficile* infections are community infections. A recent report prepared by the US Centers for Disease Control and Prevention (CDC) identifies antibiotic-resistant *Acinetobacter*, Clostridioides *difficile*, and Enterobacteriaceae as the most pressing threats.

Antibiotics have been widely used for the treatment of these Clostridioides *difficile* infections but, recently, Clostridioides *difficile* bacteria have continued to acquire resistance to antibiotics, resulting in a serious decrease in the therapeutic effect of antibiotics. In addition, secondary problems such as breaking the balance of the intestinal microbial community are caused.

In order to effectively cope with infection with Clostridioides *difficile*, which has acquired resistance to existing antibiotics, it is necessary to develop new antibiotic/antibacterial substances. In particular, it is highly urgently required to develop a pharmaceutical formulation that can provide a rapid therapeutic effect.

DISCLOSURE

Technical Problem

Accordingly, as a solution to the problem arising from the use of existing antibiotics against the harmful pathogenic bacterium Clostridioides *difficile*, the inventors of the present invention provide an antibacterial protein capable of specifically lysing Clostridioides *difficile*, provides a pharmaceutical composition that contains the antibacterial protein as an active ingredient and which can be used to treat Clostridioides *difficile* infections, and provides a method of effectively treating infections or diseases caused by Clostridioides *difficile* with the use of the pharmaceutical composition.

Accordingly, an objective of the present invention is to provide an antibacterial protein CDL200 including an amino acid sequence represented by SEQ ID NO: 1 and having activity to specifically lyse Clostridioides *difficile*.

Another objective of the present invention is to provide a method of efficiently producing an antibacterial protein CDL200 that has specific bacteriolytic activity against Clostridioides *difficile* and includes an amino acid sequence represented by SEQ ID NO: 1.

A further objective of the present invention is to provide a pharmaceutical composition for treating Clostridioides *difficile* injections, the composition containing, as an active ingredient, an antibacterial protein CDL200 capable of specifically lysing Clostridioides *difficile*.

A yet further objective of the present invention is to provide a method of treating an infection or disease caused by Clostridioides *difficile* using a pharmaceutical composition containing the antibacterial protein CDL200 as an active ingredient.

A yet further objective of the present invention is to provide a food composition containing the antibacterial protein CDL200 as an active ingredient and to provide a method of alleviating an infection or disease caused by Clostridioides *difficile* using the same.

Technical Solution

In order to accomplish the above objectives, the inventors of the present application have completed the present invention produced various antibacterial protein candidates in the form of recombinant proteins by using information on various antibacterial proteins known to have antibacterial activity against various bacterial strains and then investigated their bacteriolytic activity against Clostridioides *difficile* to select antibacterial proteins having excellent bacteriolytic activity. In addition, the inventors developed a method that can efficiently prepare the selected antimicrobial protein, and finally developed a pharmaceutical composition that contains the protein as an active ingredient and thus can be used to treat Clostridioides *difficile* infections.

Therefore, according to an aspect of the present invention, the present invention provides an amino acid sequence of an antibacterial protein CDL200 having the bacteriolytic ability specifically to Clostridioides *difficile*. Specifically, the amino acid sequence may correspond to an amino acid sequence represented by SEQ ID NO: 1. The antibacterial protein CDL200, which can specifically lyse Clostridioides *difficile*, consists of 160 amino acid residues and has a molecular weight of about 17.6 kDa.

It is apparent that the amino acid sequence represented by SEQ ID NO: 1 can be partially modified by a person skilled in the art using known techniques. Such modifications include partial substitutions of amino acid sequences, partial addition of amino acid sequences, and partial deletion of amino acid sequences. However, it is most preferable to apply the amino acid sequence represented by SEQ ID NO: 1 as disclosed in the present invention.

Further, the present invention provides Top10-CDL200 which is a strain usable to produce an antibacterial protein CDL200 having an amino acid sequence represented by SEQ ID NO: 1. The strain Top10-CDL200 is a strain made to transform *Escherichia coli* to produce CDL200 by using a plasmid having the gene sequence of SEQ ID NO: 2 produced by the inventors.

According to another aspect of the present invention, the present invention provides a pharmaceutical composition that contains, as an active ingredient, an antibacterial protein CDL200 having an amino acid sequence represented by SEQ ID NO: 1 and a bacteriolytic ability specific to Clostridioides *difficile*, thereby being effectively used for prevention or treatment of Clostridioides *difficile* infections or diseases.

The antimicrobial protein CDL200 according to the present invention, which is characterized by the amino acid sequence represented by SEQ ID NO: 1, has a specific biolytic ability to Clostridioides *difficile*, and is contained in the pharmaceutical composition of the present invention, specifically lyses Clostridioides *difficile* strains as described above, thereby exhibiting an effect in the treatment of various diseases caused by Clostridioides *difficile*. The pharmaceutical composition of the invention can thus be utilized for the treatment of diseases caused by Clostridioides *difficile*. In addition, the pharmaceutical composition of the present invention can be embodied as antibiotics, disinfectants, bactericides, therapeutics, and the like and can be used for the treatment of various diseases caused by Clostridioides *difficile*.

According to a further aspect of the invention, the present invention provides a method of treating various diseases caused by Clostridioides *difficile*, by administering an antibacterial protein CDL200 that is specific to Clostridioides *difficile* and is characterized by having an amino acid sequence represented by SEQ ID NO: 1 to animals other than humans.

The term "disease caused by Clostridioides *difficile*" herein refers to a disease caused by a Clostridioides *difficile* infection and also collectively refers to, but is not limited to, symptoms involving inflammation and necrosis of the intestines, diarrhea, gastrointestinal colitis, gastrointestinal perforation, sepsis, addictive macrocolosis, and the like.

The Clostridioides *difficile* in this specification is irrespective of whether it is sensitive to conventional antibiotics or not or whether it is resistant to conventional antibiotics. That is, it does not matter whether or not the Clostridioides *difficile* has resistance to conventional antibiotics.

In this description, the term "treatment" or "therapy" indicates all actions that inhibit infections or diseases caused by Clostridioides *difficile* and alleviate the pathological condition of the diseases caused by Clostridioides *difficile*.

In order to improve the effectiveness of the pharmaceutical composition in terms of such utilization purposes, antibacterial materials that confer antibacterial activity against other bacterial species may be added to the pharmaceutical composition of the present invention.

The pharmaceutically acceptable carrier included in the pharmaceutical composition according to the present invention is one that is generally used for the preparation of a pharmaceutical formulation, and examples thereof include lactose, dextrose, sucrose, sorbitol, mannitol, starch, acacia rubber, calcium phosphate, alginate, gelatin, calcium silicate, microcrystalline cellulose, polyvinyl pyrrolidone, cellulose, water, syrup, methylcellulose, methylhydroxybenzoate, propylhydroxybenzoate, talc, magnesium stearate, and mineral oil but are not limited thereto. The pharmaceutical composition according to the present invention may additionally include lubricants, wetting agents, sweeteners, flavors, emulsifiers, suspending agents, and preservatives, in addition to the above ingredients.

The pharmaceutical composition according to the present invention may be administered orally or via parenteral administration. In the case of parenteral administration, the pharmaceutical composition may be administered using intravenous administration, intraperitoneal administration, intramuscular administration, subcutaneous administration, or local administration. Aside from the administration methods, the pharmaceutical composition may also be used in a manner to be applied or sprayed onto a disease site.

The pharmaceutical composition according to the present invention can be formulated according to a method that can be easily performed by those who are ordinarily skilled in the art to which the present invention pertains, using a pharmaceutically acceptable carrier and/or excipient, in the form of a unit dose or in a multi-dose container. The formulation may be in the form of a solution, suspension, or emulsion in oil or a water-soluble medium, extract, powder, granule, tablet, or capsule. A dispersing agent or stabilizer may be additionally included.

The appropriate application, spray, and dosage of the pharmaceutical composition may depend on factors such as the formulation method, the mode of administration, the age, weight, gender, and diseased condition of the subject animal or person, diet, administration time, administration route, excretion rate, and responsiveness. The ordinarily skilled physician or veterinarian may readily determine and prescribe dosages effective for the desired treatment.

The pharmaceutical composition according to the invention may be embodied as antibiotics, disinfectants, bactericides, therapeutics, and the like. In addition, the pharmaceutical composition according to the present invention may also be embodied in the form of a food composition.

Advantageous Effects

The method of treating Clostridioides *difficile* infections using the pharmaceutical composition containing the antibacterial protein CDL200 having the amino acid sequence represented by SEQ ID NO: 1 as an active ingredient, according to the present invention, can effectively act not only against common Clostridioides *difficile* bacterial but also against Clostridioides *difficile* bacteria which have acquired resistance to existing antibiotics or antibiotic materials. On the other hand, the Clostridioides *difficile*-specific antibacterial protein CDL200 of the present invention affects only Clostridioides *difficile* but does not affect normal flora resident in the body, thereby minimizing the side effects of use of the pharmaceutical composition containing the antibacterial protein CDL200 as an effective component. In the case of existing antibiotics, they negatively affect event the beneficial bacteria in the body, thereby causing various side effects.

DESCRIPTION OF DRAWINGS

FIG. 1 is an electrophoretic photograph showing the results of preparing a Clostridioides *difficile*-specific antibacterial protein CDL200 characterized by containing an amino acid sequence represented by SEQ ID NO: 1, in the form of a recombinant protein, in which lane M is a protein size marker, lane 1 is a cell lysate, lane 2 is a chromatographic solution during purification, and lanes 3 through 9 are purified fractions.

FIG. 2 shows the results of a liquid lysis test of confirming the effect of an antibacterial protein CDL200 on Clostridioides *difficile*. A negative control used was a buffer solution itself that did not contain an antibacterial protein CDL200, meaning that a lower value indicates a better antibacterial activity. The horizontal axis represents the strain type and the vertical axis represents the absorbance at 600 nm.

FIG. 3 shows the results of a turbidity reduction assay of confirming the effect of an antibacterial protein CDL200 on Clostridioides *difficile*. A negative control used was a buffer solution itself that did not contain an antibacterial protein CDL200. The horizontal axis represents time in minutes and the vertical axis represents absorbance at 600 nm.

BEST MODE

Hereinafter, the present invention will be described in more detail with reference to Examples. However, the Examples are merely examples of the present invention, and the scope of the present invention is not limited to the Examples.

Example 1: Preparation of Clostridioides *Difficile*-Specific Antibacterial Protein DL200

A method of preparing a Clostridioides *difficile*-specific antibacterial protein CDL200 will be described below. In this example, TOP10-CDL200, which is a strain produced by transforming *Escherichia coli* using a plasmid having the gene sequence of SEQ ID NO: 2 produced by the inventors, was used as a production strain.

20 ml of LB medium containing 50 μg/ml kanamycin (Tryptone 10 g/L, yeast extract 5 g/L, NaCl 10 g/L) was inoculated with 20 μl of the TOP10-CDL200, followed by shaking culture at 37° C. for overnight. The next day, the overnight culture solution was added to 0.5 L of LB medium containing 50 μg/ml kanamycin in a 1/100 volume ratio. The culture was performed under conditions of a stirring speed of 220 rpm and a temperature of 37° C. When the cell concentration reached 0.5 on an absorbance basis at 600 nm, anhydrotetracycline was added so that the final concentration became 0.2 μg/ml. In this way, the expression of an antibacterial protein CDL200 of the amino acid sequence represented by SEQ ID NO: 1 was induced. Then, 3 hours of culturing was performed.

After the end of the culture, the cell culture was taken and centrifuged at 7,000 rpm and 4° C. for 15 minutes to recover a cell precipitate. The collected cell precipitate was floated in 30 ml of a buffer solution (50 mM $K_3PO_4$, pH 7.5). The cells in the cell suspension thus prepared underwent ultrasonic pulverization. The ultrasonic pulverization was performed in a manner that a cycle of three seconds of cell breaking and 3 seconds of resting was repeated for a total of 15 minutes in an ice bath.

After the cell breaking, the cell-broken solution was centrifuged at 7,000 rpm at 4° C. for 15 minutes to obtain a supernatant, and the supernatant was purified through a conventional cation-exchange chromatography purification process.

The purification process will be briefly described below. In the present example, 5 ml of HiTrap™ SP FF (GE Healthcare Company) was used as a cation-exchange resin. The chromatography was performed after pre-equilibrating the column with buffer A (50 mM tris-hydrochloric acid, pH 7.5). A sample was dropped on the column, and 10 column volume (CV) of the buffer A was forced to flow at a flow rate of 5 ml/min for washing. After the washing, chromatography was performed at a flow rate of 5 ml/min in a condition in which a concentration gradient from the buffer A to the buffer B (50 mM tris $K_3PO_4$ hydrochloric acid, 1 M NaCl, pH 7.5) became from 0% to 100% was obtained. In this process, the elution of the target antibacterial protein CDL200 having the amino acid sequence represented by SEQ ID NO: 1 was achieved. FIG. 1 shows the results of electrophoretic analysis of the purified antibacterial protein CDL200 using the chromatographic purification process.

Among the obtained purified fractions, fractions containing the antibacterial protein CDL200 at a high concentration, which correspond to lanes 3 to 9 in FIG. 1, were collected, and the collected fractions were subjected to dialysis using a buffer solution (20 mM $K_3PO_4$ hydrochloric acid, pH 7.0) for medium exchange. Thus, an antibacterial protein CDL200 solution having a purity of 90% or more was obtained.

Example 2: Investigation of Antibacterial Activity of Antibacterial Protein CDL200 Through Liquid Lysis Test Antibacterial activity of the antibiotic resistant Clostridioides *difficile* of the Clostridioides *difficile*-specific antibacterial protein CDL200 prepared according to Example 1 was investigated. As the Clostridioides *difficile* used in the antibacterial activity investigation, eight strains of antibiotic resistant Clostridioides *difficile* were used. The details thereof are shown in Table 1.

TABLE 1

| Species | Strain | Source |
|---|---|---|
| *Clostridioides difficile* | CCARM 0184 | Antibacterial resistant bacteria bank |
| | CCARM 0185 | |
| | CCARM 0186 | |
| | CCARM 0187 | |
| | CCARM 0188 | |
| | CCARM 0189 | |
| | CCARM 0190 | |
| | CCARM 0348 | |

Antibacterial activity investigations were performed using a liquid lysis test. Experimental methods for the liquid lysis test will be described below. The test strain was floated in a physiological saline solution to a concentration corresponding to an absorbance of 0.5 at 600 nm, and 0.05 ml of the CDL200 solution (20 μM) prepared in Example 1 was added to and mixed well with the solution (final concentration: 2 μM). The mixture was left still at 37° C. for 30 minutes, and then the absorbance was measured. In this case, a buffer solution (20 mM $K_3PO_4$, pH 7.0) that does not contain the protein CDL200 was added in place of the antibacterial protein CDL200 solution as a negative control. On the other hand, the antibacterial activity evaluation of bacteria other than Clostridioides *difficile* was performed using the same method as in the liquid lysis test. The evaluation was performed on 2-week *Enterococcus faecalis* 2, 2-week *Enterococcus faecium*, 2-week *Staphylococcus aureus* 2, 2-week *Salmonella*, and 2-week *Escherichia coli* 2.

As a result, the antibacterial protein CDL200 exhibited bacteriolytic activity only against Clostridioides *difficile* and did not exhibit the bacteriolytic activity against the other tested strains. The test results for Clostridioides *difficile* against which the bacteriolytic activity was confirmed are shown in FIG. 2.

On the basis of these results, it was confirmed that the antibacterial activity of the antibacterial protein of the present invention is very specific to Clostridioides *difficile*.

Example 3: Investigation of Antibacterial Activity of Antibacterial Protein CDL200 Through Turbidity Reduction Assay The antibacterial activity of the antibacterial protein CDL200 against the eight strains of Clostridioides *difficile* tested in Example 2 was evaluated using a turbidity reduction assay. Experimental methods for the turbidity reduction assay will be described below. After the test bacteria were suspended in a physiological saline solution such that an absorbance was about 0.6 to 0.7 at 600 nm, 0.1 ml of the antibacterial protein CDL200 solution was added to the suspension so that the final concentration was 2.5 μg/ml. The absorbance at 600 nm was then measured for 30 minutes. A buffer solution (20 mM $K_3PO_4$, pH 7.0) containing no antibacterial protein CDL200 was used instead of the antibacterial protein CDL200 solution, as a negative control.

The experimental results for eight strains were similar. In the results, the antibacterial protein CDL200 rapidly lysed the tested bacteria so that the absorbance was reduced. This rapid lytic effect is characteristic of the antibacterial protein CDL200 according to the present invention, and no existing antibiotics have not yet provided such a good effect. The experimental results for CCARM 0190 strains are presented in FIG. 3.

The results described above clearly showed that the Clostridioides *difficile*-specific antibacterial protein CDL200 of the present invention could eventually kill Clostridioides *difficile* by lysis. This characteristic shows that a pharmaceutical composition containing the Clostridioides *difficile*-specific antibacterial protein CDL200 can be utilized for the purpose of killing Clostridioides *difficile* upon infection with Clostridioides *difficile* and can also be utilized in the same manner as conventional antibiotics for the purpose of treating Clostridioides *difficile* infections.

Example 4: Investigation of Therapeutic Effect of Clostridioides *Difficile*-Specific Antibacterial Protein DL200 on Clostridioides *Difficile* Infection The therapeutic effect of the Clostridioides *difficile*-specific antibacterial protein CDL200 on Clostridioides *difficile* infections was investigated through infection animal model experiments.

Specifically, 6-week-old SD rats [of a specific pathogen-free (SPF) grade] were used as test animals. A total of 12 rats were given drinking water containing antibiotics (kanamycin 0.4 mg/ml, gentamycin 0.035 mg/ml, colistin 850 U/ml, metronidazole 0.215 mg/ml, and vancomycin 0.045 mg/ml) for 5 days. Sterilized drinking water was then provided for 2 days. Clindamycin (20 mg/kg) was injected intraperitoneally on the last day of the provision of the sterilized drinking water (i.e., one day before Clostridioides *difficile* infection). The day after the clindamycin injection, a Clostridioides *difficile* forced infection was performed. The Clostridioides *difficile* forced infection was performed by preparing Clostridioides *difficile* in a sporulated state, floating the prepared strain with sterilized physiological saline, and injecting 0.2 ml of the prepared fluid (corresponding to about 107 CFU/ml) into the gavage using a Sonde. In forty-eight hours after the forced infection, the rats were divided into two groups. A first group composed of six rats received no test treatment drug (control group), while a second group composed of the other 6 rats received the test treatment drug three times a day. The test treatment drug was forcedly administrated into the gavage using a Sonde. The test treatment drug administration was continued for 7 days. The test treatment drug was prepared by putting a powder which is a mixture of a lyophilizate of an antibacterial protein CDL200 solution and an excipient (sucrose) in conventional enteric capsules. The amount of the test treatment drug per capsule was 5 mg of the antibacterial protein CDL200. The survival of the animals in each group was investigated until Day 7 of test treatment. The results are presented in Table 2.

TABLE 2

| | Survival rate (%) | | | | | | |
|---|---|---|---|---|---|---|---|
| | D1 | D2 | D3 | D4 | D5 | D6 | D7 |
| Control Group | 100 | 83.3 | 50 | 16.7 | 0 | 0 | 0 |
| Test group | 100 | 100 | 100 | 100 | 100 | 100 | 100 |

From the above results, it is confirmed that the antibacterial protein CDL200 of the present invention is effective in treating a Clostridioides *difficile* infection. This characteristic indicates that a pharmaceutical composition containing the antibacterial protein CDL200 of the present invention as an active ingredient can be utilized for treatment of fungal infections.

While the present invention has been particularly shown and described with reference to exemplary embodiments thereof, those skilled in the art will appreciate that the specific description is only a preferred embodiment, and that the scope of the present invention is not limited thereto. It is therefore intended that the scope of the present invention be defined by the claims appended hereto and their equivalents.

The invention claimed is:

1. A Clostridioides *difficile*-specific antibacterial protein CDL200 having specific antibacterial activity to Clostridioides *difficile* and comprising the amino acid sequence represented by SEQ ID NO: 1.

2. The Clostridioides *difficile*-specific antibacterial protein CDL200 of claim 1, characterized in that the antibacterial protein CDL200 comprises 160 amino acids and has a molecular weight of 17.6 kDa.

3. A pharmaceutical composition for treating a Clostridioides *difficile* infection, the composition comprising the Clostridioides *difficile*-specific antibacterial protein CDL200 of claim 1 as an active ingredient.

4. The pharmaceutical composition of claim 3, wherein the composition is a food, antibiotic, disinfectant, or fungicide.

5. A method of producing the Clostridioides *difficile*-specific antibacterial protein CDL200 of claim 1 using a strain produced by transforming *Escherichia coli* using a plasmid represented by the gene sequence of SEQ ID NO: 2.

6. A method for treating a subject having a Clostridioides *difficile* infection or disease caused by Clostridioides *difficile* comprising administering to the subject a composition comprising Clostridioides *difficile*-specific antibacterial protein CDL200 having specific antibacterial activity to Clostridioides *difficile* and comprising the amino acid sequence represented by SEQ ID NO: 1.

7. A method of killing a cell infected with Clostridioides *difficile* comprising contacting said cell with a composition comprising Clostridioides *difficile*-specific antibacterial protein CDL200 having specific antibacterial activity to Clostridioides *difficile* and comprising the amino acid sequence represented by SEQ ID NO: 1.

* * * * *